United States Patent
Petersen

(10) Patent No.: US 6,734,785 B2
(45) Date of Patent: May 11, 2004

(54) TACTILE DISPLAY SYSTEM

(76) Inventor: Robert C. Petersen, 37 Prospect Hill Rd., Noank, CT (US) 06340

(*) Notice: Subject to any disclaimer, the term of this patent is extended or adjusted under 35 U.S.C. 154(b) by 229 days.

(21) Appl. No.: 10/001,374

(22) Filed: Oct. 23, 2001

(65) Prior Publication Data

US 2002/0050923 A1 May 2, 2002

Related U.S. Application Data

(60) Provisional application No. 60/243,892, filed on Oct. 27, 2000.

(51) Int. Cl.$^7$ ................................................. H04B 3/36
(52) U.S. Cl. ............... 340/407.1; 340/7.6; 340/825.19; 340/407.2; 72/413; 72/473; 345/114; 345/156; 434/113; 434/114
(58) Field of Search ............................... 340/407.1, 7.6, 340/825.19, 407.2; 345/31, 110, 427, 428, 108, 114, 156; 434/114, 115, 112, 113; 72/413, 473, 478, 7.1, 7.3, 31.01

(56) References Cited

U.S. PATENT DOCUMENTS

| | | | |
|---|---|---|---|
| 2,891,324 A | 6/1959 | Zuk | 434/114 |
| 3,395,247 A | 7/1968 | Fieldgate | 178/17 R |
| 3,510,967 A | 5/1970 | King et al. | 434/114 |
| 3,592,965 A | 7/1971 | Dies | 348/62 |
| 3,987,438 A | 10/1976 | Lindenmueller et al. | 340/407 |
| 4,033,053 A | 7/1977 | Engler | 434/114 |
| 4,044,350 A | 8/1977 | Tretiakoff et al. | 340/407.2 |
| 4,178,586 A | 12/1979 | Schonherr | 340/407.1 |
| 4,191,945 A | 3/1980 | Hannon et al. | 340/407 |
| 4,194,190 A | 3/1980 | Bareau | 340/407.2 |
| 4,215,490 A | 8/1980 | Fewell | 434/114 |
| 4,266,936 A | 5/1981 | Rose et al. | 434/114 |
| 4,445,871 A | 5/1984 | Becker | 434/114 |
| 4,473,356 A | 9/1984 | Fernando et al. | 434/114 |
| 4,500,293 A | 2/1985 | Eltgen | 434/114 |
| 4,586,903 A | 5/1986 | Burchart | 434/114 |
| 4,586,904 A | 5/1986 | Chlumsky | 434/114 |
| 4,871,992 A | 10/1989 | Petersen | 340/407 |
| 5,086,287 A | 2/1992 | Nützel | 340/407 |
| 5,453,012 A | 9/1995 | Hudecek | 434/114 |
| 5,466,154 A | 11/1995 | Thompson | 434/114 |
| 5,546,784 A * | 8/1996 | Haas et al. | 72/413 |
| 5,583,478 A | 12/1996 | Renzi | 340/407.1 |
| 5,717,423 A * | 2/1998 | Parker | 345/108 |
| 5,736,978 A | 4/1998 | Hasser et al. | 345/173 |
| 5,766,014 A | 6/1998 | Ida et al. | 434/114 |
| 5,772,440 A | 6/1998 | Ida | 434/114 |
| 6,012,314 A * | 1/2000 | Sullivan et al. | 72/413 |
| 6,209,380 B1 * | 4/2001 | Papazian et al. | 72/413 |
| 6,462,840 B1 * | 10/2002 | Kravtsov | 358/474 |

* cited by examiner

Primary Examiner—Davetta W. Goins
(74) Attorney, Agent, or Firm—Albert W. Hilburger

(57) ABSTRACT

A tactile display system includes a housing containing a tactile pin movable axially transverse of a reference surface and an actuator mechanism engageable therewith for selective movement between raised and lowered positions. An elongated electromagnet distant from the reference surface is aligned with the tactile pin and has spaced poles of opposite, selectively reversible, polarity. A generally spherical rotatable positioning member being a permanent magnet having a peripheral surface which is partially a spherical surface and partially a truncated surface has an axis of rotation coaxial with the tactile pin and the electromagnet and is responsive to operation of the electromagnet, being movable between a first position at which the spherical surface faces the tactile pin, causing positioning of the tactile pin at the raised position and a second position at which the truncated surface faces the tactile pin causing positioning of the tactile pin at the lowered position.

36 Claims, 8 Drawing Sheets

TACTILE DISPLAY SYSTEM

The present application is related to co-pending Provisional Application Serial No. 60/243,892 of Robert C. Petersen, filed Oct. 27, 2000, entitled "Tactile Display System", based on which priority is herewith claimed under 35 U.S.C. §119(e) and the disclosure of which is incorporated herein by reference in its entirety.

BACKGROUND OF THE INVENTION

1. Field of the Invention

The present invention relates generally to tactile display apparatus, and, more particularly, to an electromechanical system for selectively displaying and erasing information from a reference surface.

2. Description of the Prior Art

A particularly desirable application for the invention concerns the presentation of the Braille character set for visually impaired people. However, there are numerous other applications for the invention.

For example, a large matrix of tactile display units could be employed to display numbers, letters, and figures as raised patterns in devices that provide viewing screens for the visually impaired. The sighted can also benefit from the invention. For example, tactile display units can be utilized singularly or in groups as displays on operating consoles for limited or low light conditions such as aircraft, mining equipment, and military hardware where the raised patterns can be utilized as nonvisual indicators.

Braille was devised to enable the visually impaired to read alpha-numeric characters and is in the form of a six unit code, where each cell represents a character or symbol. Thus, with a six unit code in each cell, there is a matrix of two columns with three in a column. By employing a six unit code, a maximum of sixty-four combinations can be created for which include the twenty-six letters of the alphabet, the numbers zero and one through nine, and various symbols such as case indicators, punctuation, and so forth.

A tactile display unit of the type which will be described in detail below is one which provides for the raising and lowering of a physical point above a plane of reference in such a manner that the change of state from one position to another, that is, from a raised position to a lowered position, or vice versa, is physically detectable by the sense of touch. Numerous mechanisms have been devised to provide such tactile displays. They have generally been large, complex, cumbersome, and expensive to construct, operate, and maintain. Many have been patented. Typical of patents which disclose such devices utilizing magnetically operable pins or solenoids are U.S. Pat. Nos. 3,395,247; 3,510,967; 3,592,965; 3,987,438; 4,033,053; 4,178,586; 4,191,945; and 4,194,190. Other typical patents disclose a variety of other mechanisms for achieving a similar result. For example, U.S. Pat. No. 2,891,324 discloses a mechanism which utilizes piano-like rolls; U.S. Pat. Nos. 4,044,350 and 4,473,356 disclose piezoelectric reeds; U.S. Pat. No. 4,586,904 discloses magnetically operable balls; U.S. Pat. No. 4,215,490 discloses mechanical linkages; U.S. Pat. No. 4,266,936 discloses bimetallic latches; and U.S. Pat. Nos. 4,445,871 and 4,586,903 disclose the use of continuous belts. Because of their complexity, most of these known devices are expensive to manufacture, thereby resulting in an end product with a cost that is prohibitive to many consumers. Also, the power requirements of some of these devices require drive levels that are beyond the capability of most target units without the addition of a supplemental power supply.

The present invention is a direct descendant of U.S. Pat. No. 4,871,992 in which the up and down motion of a touch pin is achieved by driving a cam with small positive and negative voltages. Simple decoding circuitry assigns positive voltages to a bit that is in the high (logical 1) state and a negative voltage to a bit that is in the low (logical 0) state. In a computer Braille example, a eight bit data bus would be established to drive all eight touch pins of a tactile display unit, which are arranged in a 2×4 matrix simultaneously. This is a departure from standard Braille which is comprised of six touch pins arranged in a 2×3 matrix. The present invention can support these and any other number and arrangement of pins. These high and low signals alternately supply positive and negative voltages to an electromagnet located below the cam. Embodied in the cam is a permanent magnet which would be repelled by the electromagnetic force. By the construction of the device, this action would force the cam to rotate about its axis to position the pin at the desired point. The high point of the contour on the cam would desirably have a small depression in which the pin can temporarily come to rest. Due to its design, however, the lower portion of the cam does not require an additional depression. Under the bias of a spring on the pin, the cam as well as the pin remain mutually in their desired positions until an opposite voltage is applied. This arrangement provides a latching mechanism for the device. The electrical current resulting from the drive voltages and the pulse duration is sufficient to force the cam out of its "latched" position to the desired state without a constant voltage being applied to maintain the desired state. The entire disclosure of U.S. Pat. No. 4,871,992 is hereby incorporated into this specification in its entirety.

It was with knowledge of the prior art as just described and with the goal of improving upon known technology that the present invention was conceived and has now been reduced to practice.

SUMMARY OF THE INVENTION

The present invention relates to a tactile display system which includes a housing containing a tactile pin movable axially transverse of a reference surface and an actuator mechanism engageable with the tactile pin for its selective movement between raised and lowered positions. An elongated electromagnet distant from the reference surface is aligned with the tactile pin and has spaced poles of opposite, selectively reversible, polarity. A generally spherical rotatable positioning member being a permanent magnet having a peripheral surface which is partially a spherical surface and partially a truncated surface has an axis of rotation coaxial with the tactile pin and the electromagnet and is responsive to operation of the electromagnet, being movable between a first position at which the spherical surface faces the tactile pin, causing positioning of the tactile pin at the raised position and a second position at which the truncated surface faces the tactile pin causing positioning of the tactile pin at the lowered position.

Depending on the desired application, the apparatus of the invention could be fabricated in a variety of sizes. In the instance of a Braille character display, for example, a size would be chosen that would allow a two-by-three matrix of tactile display devices to be packaged to provide a Braille character readout at the same scale as an embossed Braille text.

In a computer Braille application, each tactile display unit is preferably configured into a two-by-four matrix of these tactile display devices. By arranging these units into a matrix not unlike core memory or a computer keyboard, a series of these units can be addressed with a minimum of internal decoding and driver circuitry.

An ASCII character is translated into a eight bit computer Braille representation and transmitted along the rows and columns of the matrix to the proper unit.

One application of the invention as presented in this disclosure is as a device for representing Braille characters. However, any touchable type of display that utilizes a matrix of pins to represent numbers, letters, or figures could gain a benefit from this device. Other possible applications include computer CRT repeaters, adding machine displays, electronic clocks, digital thermometers, elevator floor indicators and any other device that utilizes digital display technology. The ultimate goal of the invention is to provide a design that will result in the fabrication of a low-cost, low power device that employs a simple mechanism to display tactile data that ensures a long life span for each component.

Primary features of the invention, then, include its compact, durable, and simplified design utilizing a minimum of moving parts and commonly available materials. It is inexpensive to manufacture and maintain and is capable of achieving a long life span. Additionally, its modular design enables an end use to employ as many or as few tactile display devices or units as necessary.

Another feature of the present invention is the provision of a tactile display system which operates to selectively display and erase information from a reference surface.

Still another feature of the present invention is the provision of such a tactile display system which includes a tactile pin movable axially in directions transverse of the reference surface between raised and lowered positions and an actuator mechanism engageable with the tactile pin for selectively moving the tactile pin between the raised and lowered positions.

Yet another feature of the present invention is the provision of such a tactile display system for which the actuator mechanism includes an elongated electromagnet distant from the reference surface having first and second spaced poles of opposite, selectively reversible, polarity, the longitudinal axes of the tactile pin and the electromagnet being mutually aligned.

Still a further feature of the present invention is the provision of such a tactile display system for which the actuator mechanism includes a generally spherical rotatable positioning member having an axis of rotation coaxial with the longitudinal axes of the tactile pin and of the electromagnet, the rotatable positioning member being a permanent magnet having a peripheral surface which is partially a spherical surface and partially a truncated surface, the positioning member being responsive to operation of the electromagnet and being movable between a first position at which the spherical surface faces the tactile pin and causes positioning of the tactile pin at the raised position and a second position at which the truncated surface faces the tactile pin and causes positioning of the tactile pin at the lowered position.

Yet a further feature of the present invention is the provision of such a tactile display system in which the electromagnet is intermediate the tactile pin and the rotatable positioning member.

Still another feature of the present invention is the provision of such a wherein the rotatable positioning member is intermediate the tactile pin and the electromagnet.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
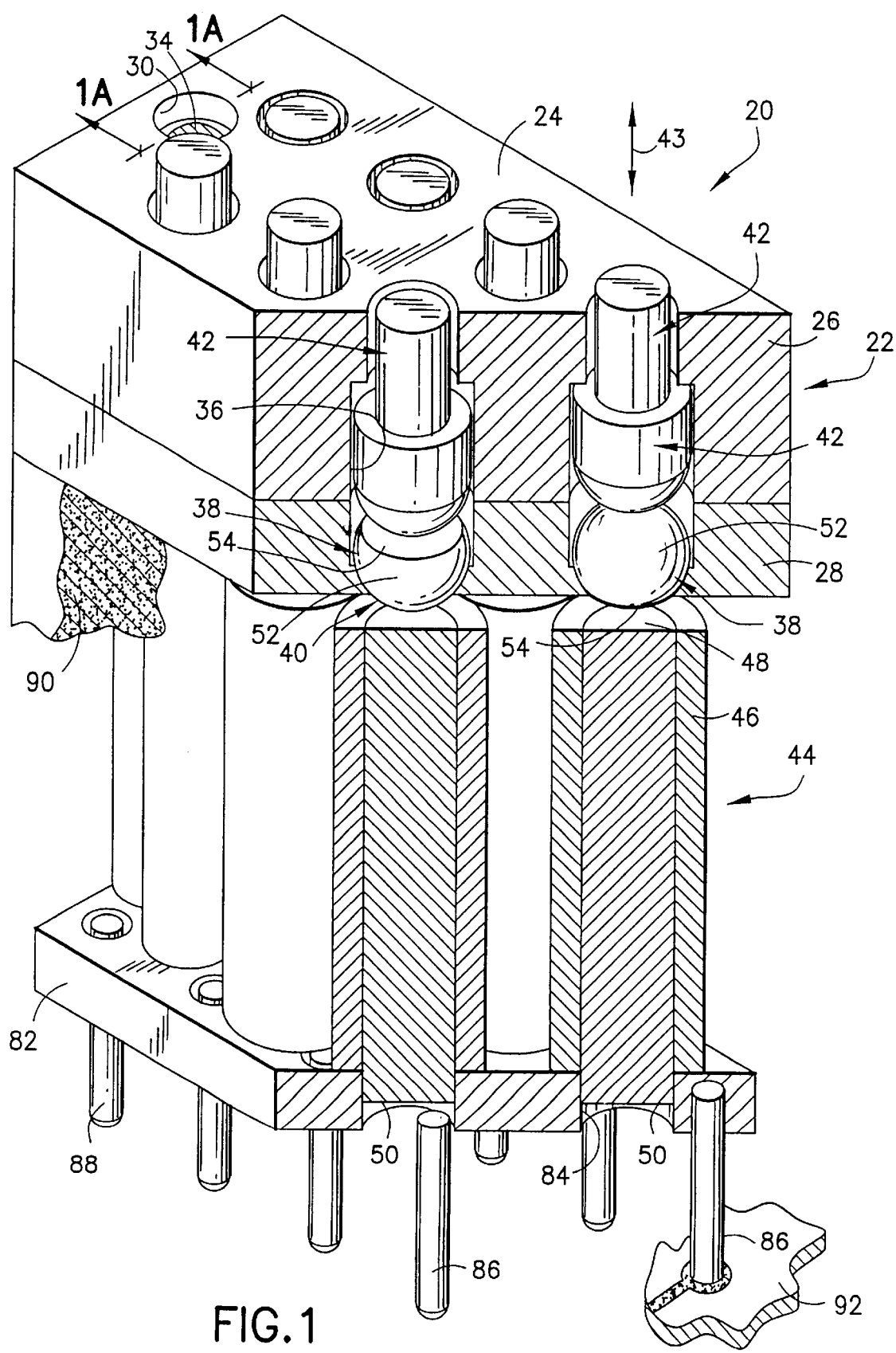
FIG. 1 is a perspective view, certain parts being cut away and shown in section to illustrate a tactile display system embodying the invention.
Figure 1A:
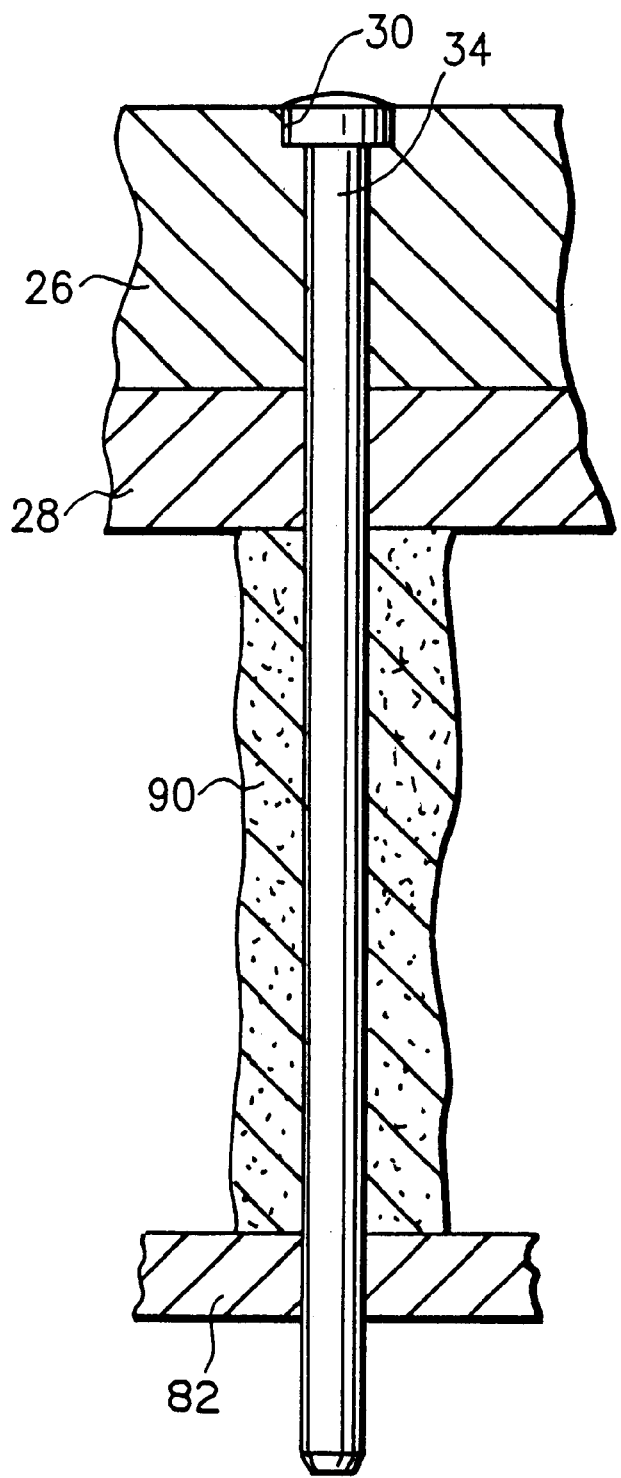
FIG. 1a is an elevation view in section to illustrate a portion of the tactile display system of FIG. 1.

Referring to FIG. 1, there is shown a perspective view of a tactile display system 20 incorporating features of the present invention. Although the present invention will be described with reference to the embodiments shown in the drawings, it should be understood that the present invention can be embodied in many alternate forms of embodiments. In addition, any suitable size, shape or type of elements or materials could be used.

The tactile display system 20 includes a housing 22 with a generally planar reference surface 24. The housing 22 includes an upper panel 26 and a lower panel 28 assembled in a sandwich construction. The upper panel 26, preferably, though not necessarily, has a plurality of mounting bores 30 and the lower panel similarly has a plurality of mounting bores 32 mutually aligned with the bores 30. Suitable mounting studs 34 are received in the mounting bores 30, 32 for fastening the upper and lower panels together in a known manner.

The upper panel 26 has a plurality of transverse bores 36 communicating with the reference surface 24 and the lower panel 28 has a plurality of cavities 38 for freely receiving a rotatable positioning member 40, each cavity being in communication with an associated one of the transverse bores.

Figure 2:
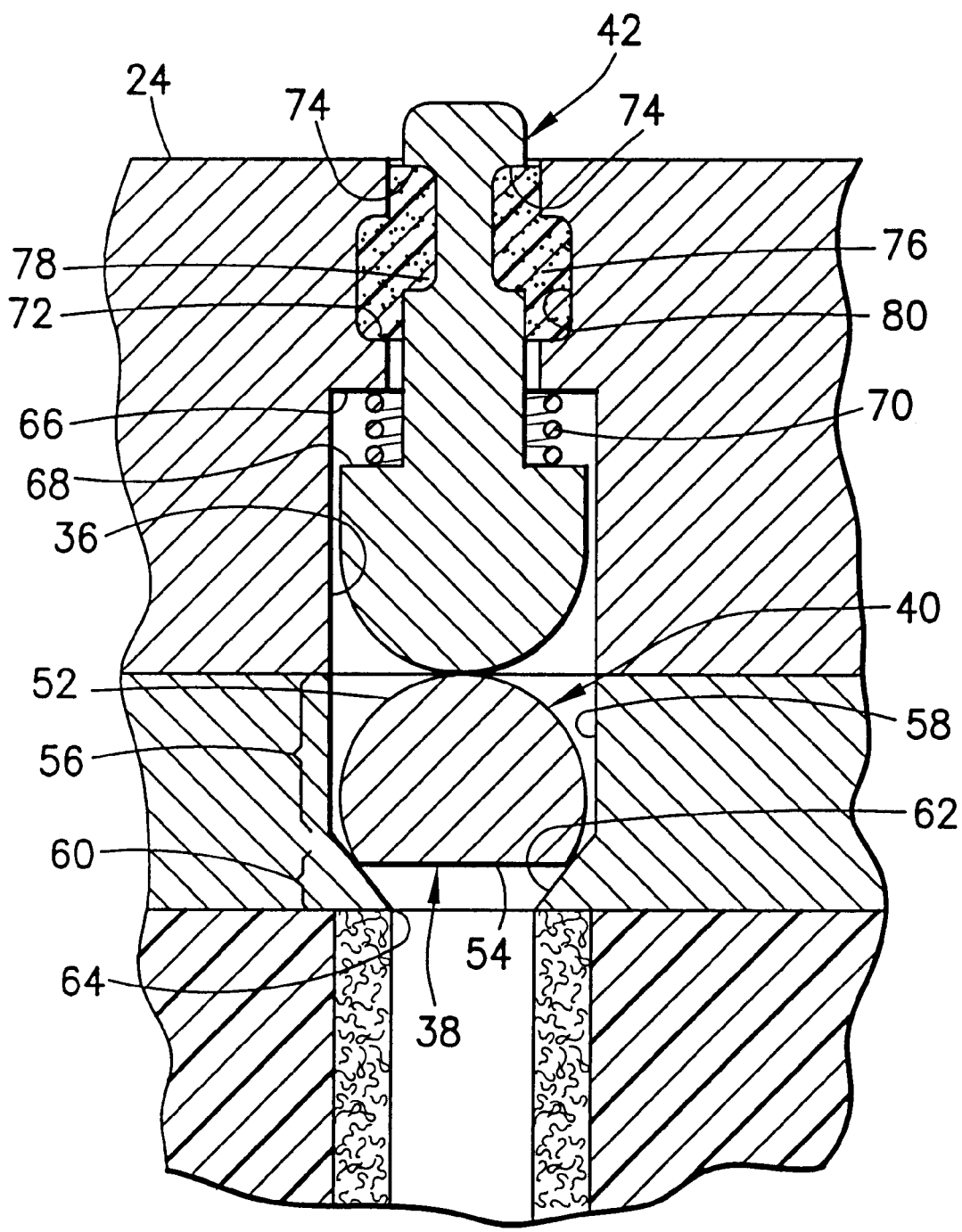
FIG. 2 is a detail elevation view, in section, illustrating a portion of the tactile display system shown in FIG. 1 and indicating one position of the parts thereof.
Figure 2A:
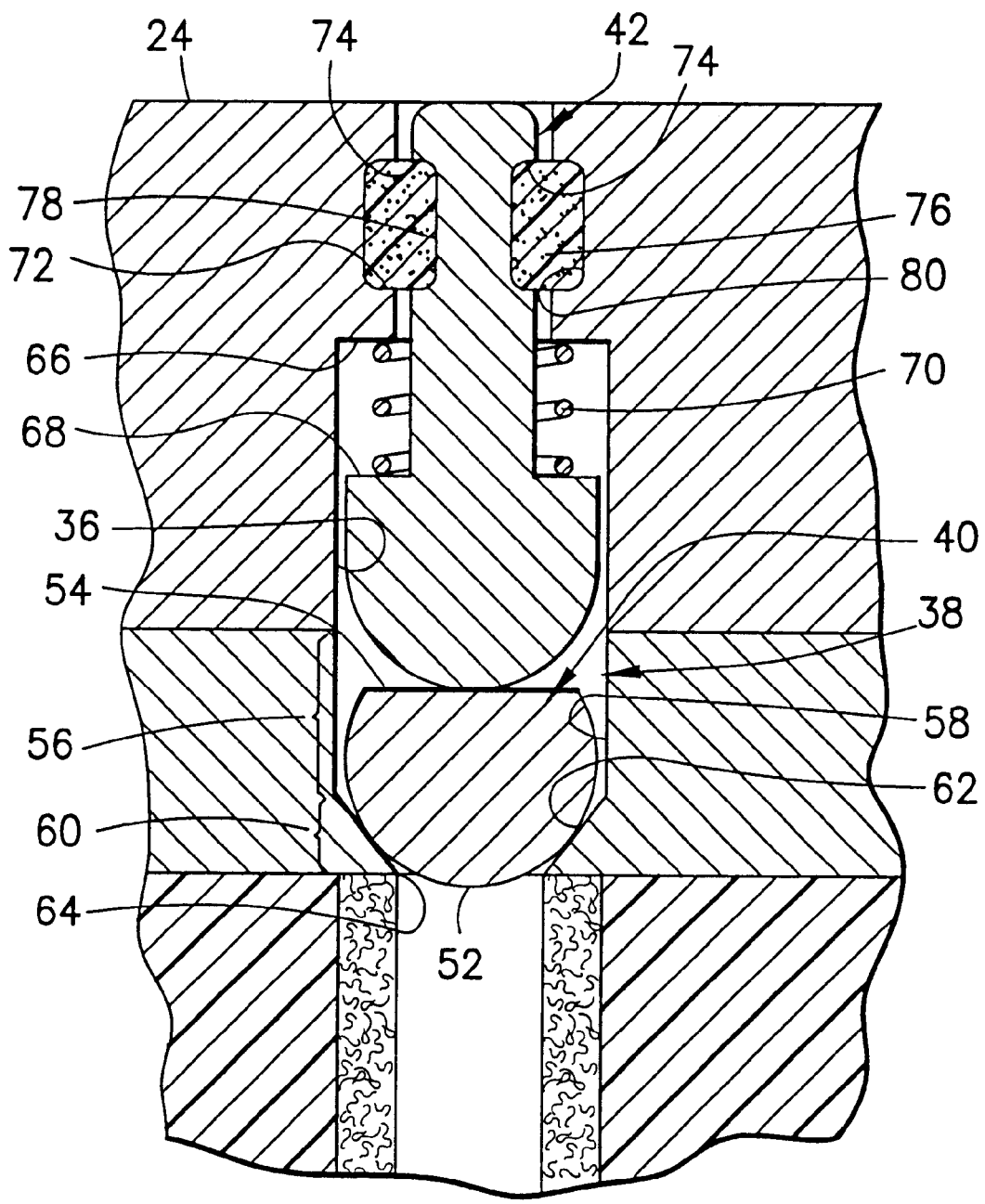
FIG. 2a is a detail elevation view, in section, similar to FIG. 2 but indicating another position of the parts thereof.

A tactile pin 42 is received in the transverse bore 36 and movable along its longitudinal axis in directions transverse of the reference surface 24, as indicated by a double-headed arrow 43 between raised and lowered positions. In FIG. 1, an upper tip end of the tactile pin 42 on the left side in the foreground is flush with the reference surface 24 and the tactile pin is in the lowered position while the upper tip end of the tactile pin on the right side in the foreground is raised above the reference surface. FIGS. 2 and 2A, respectively, also illustrate the lowered and raised positions of the tactile pins 42, respectively.

An actuator mechanism 44 is employed for selectively moving the tactile pin 42 between the raised and lowered positions. The actuator mechanism 44 includes an elongated electromagnet 46 distant from the reference surface 24 and having first and second spaced poles 48, 50 of opposite, selectively reversible, polarity. The longitudinal axes of the tactile pin 42 and the of the electromagnet 46 are mutually aligned.

The rotatable positioning member 40 mentioned above is a permanent magnet and is generally spherical, that is, has a peripheral surface which is partially a spherical surface 52 and partially a truncated, or flattened, surface 54. The positioning member is received in the cavity 38 which is intermediate the reference surface 24 and the electromagnet 46 and has an axis of rotation, or center, which is coaxial with the longitudinal axes of the tactile pin 42 and of the electromagnet 46. The positioning member is biased into engagement with the tactile pin in a manner to be described and is rotatable in response to operation of the electromagnet between a first raised position (see especially FIG. 2) at which the spherical surface 52 engages the tactile pin 42 and moves it to the raised position and a second lowered position (see FIG. 2A) at which the truncated surface 54 engages the tactile pin and moves it to the lowered position.

Turning more specifically to FIGS. 2 and 2A, each cavity 38 mentioned above has a first region 56 which includes a cylindrical bore 58 coaxial with the transverse bore 36 and a second region 60 which includes a regular annular beveled surface 62 extending from a major diameter at its intersection with the cylindrical bore to a minor diameter 64. The minor diameter 64 is smaller than the diameter of the rotatable positioning member 40 received in the cavity 38. The rotatable positioning member is slidably, or rotatably, engaged with the annular beveled surface 62 which lies in a plane of revolution preferably angled 45° from the longitudinal axes of the tactile pin 42 and of the electromagnet 46.

The transverse bore 36 has a first annular shoulder 66 facing away from the reference surface 24 and the tactile pin has a second annular shoulder 68 facing and aligned with the first annular shoulder. A compression spring 70 encircles the tactile pin and extends between the annular shoulders 66, 68, respectively. In addition to the construction just described, or in place of it, the transverse bore 36 has an annular shoulder 72 facing the reference surface 24 and the tactile pin 42 has an annular shoulder 74 facing and aligned with the annular shoulder 72. In this instance, the resilient member includes polymeric sealing material 76 having a resilient quality, for example, LOCTITE 5910 Flange Sealant part #21746, available from Loctite Corporation of Newington, Conn., encircling the tactile pin 42 and extending between the annular shoulders 72, 74. In actual fact, the annular shoulders 72, 74 are each a part of annular grooves 78, 80 formed, respectively, in the tactile pin 42 and in the transverse bore 36.

While FIGS. 2 and 2a illustrate the simultaneous employment of both spring 70 and of polymeric sealing material 76 to bias the tactile pin in the direction of the actuator mechanism 44, it will be understood that an actual operating system according to the invention may satisfactorily employ only one or the other of the resilient members. Also, it will be appreciated that the constructions illustrated in FIGS. 2 and 2a would be present in FIG. 1 but are not included in FIG. 1 for simplicity of illustration and explanation relating to that figure.

Turning back to FIG. 1, a terminal board 82 lies in a plane generally parallel to that of the reference surface 24 and spaced from the lower panel 28 and has a mounting bore 84 therein for fittingly receiving the second pole 50 of the electromagnet 46. A plurality of data line pins 86 are fixed to the terminal board 82 and project from the terminal board in a direction extending away from the reference surface 24 and the data line pins are being in electrical continuity with the electromagnet 46. One or more ground pins 88 are similarly fixed to the terminal board 82 and project from the terminal board in a direction extending away from the reference surface 24 and each ground pin is in electrical continuity with an associated tactile pin 42. Preferably, the lower panel 28 is composed of suitable shielding material for electrically and magnetically isolating each actuator mechanism 46 from its neighboring actuator mechanism. Also, the region between the lower panel 28 and the terminal board 82 is desirably filled with a suitable dielectric potting compound 90 to provide protection, insulation, heat dissipation and structural integrity to the system 20.

Figure 3:
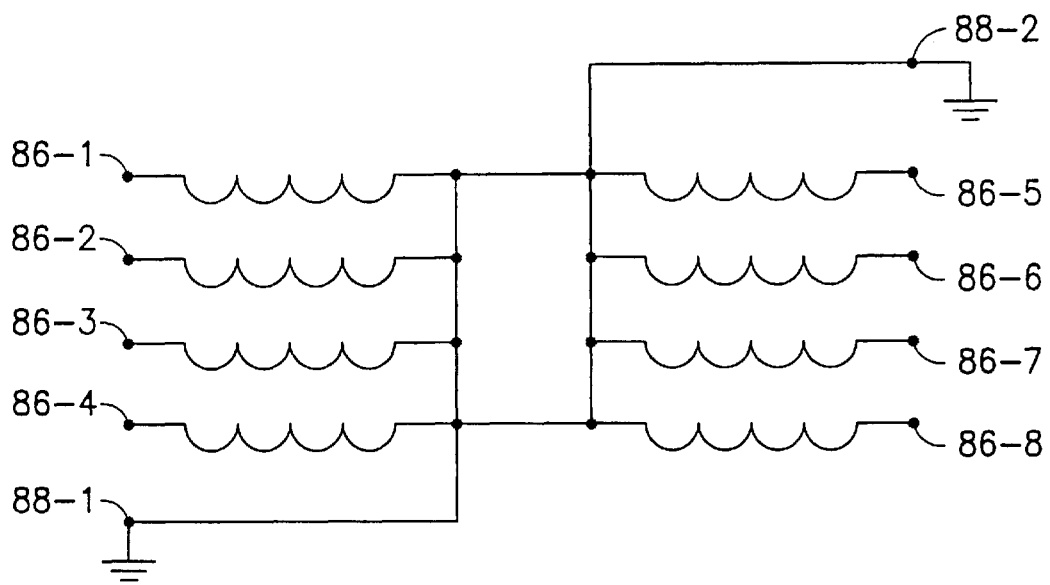
FIG. 3 is an electrical schematic for one manner of operating the tactile display system of the invention.

With particular reference now to an electrical schematic diagram of FIG. 3, when an electrical signal originates on any one of the data line pins 86-1 through 86-8 under the control of circuitry 92 to which the tactile display system 20 is electrically connected, that data line pin energizes the electromagnet 46 to rotate the rotatable positioning member 40 in a direction that corresponds to the polarity of the electrical signal. Movement of the tactile pin 42 engaged with the rotatable positioning member 40 is responsive to the positioning of the rotatable positioning member and is thereby raised or lowered accordingly. In FIG. 3. each actuator mechanism 44 shares a common ground, illustrated as 88-1 and 88-2. in this configuration, a + (positive) or − (negative) actuating signal may only originate on one data line pin 86 at any time. To actuate all of the data line pins, they must be accessed sequentially. The advantage of this design is that it reduces the total number of pins required for each device, that is, tactile display system 20.

Figure 4:
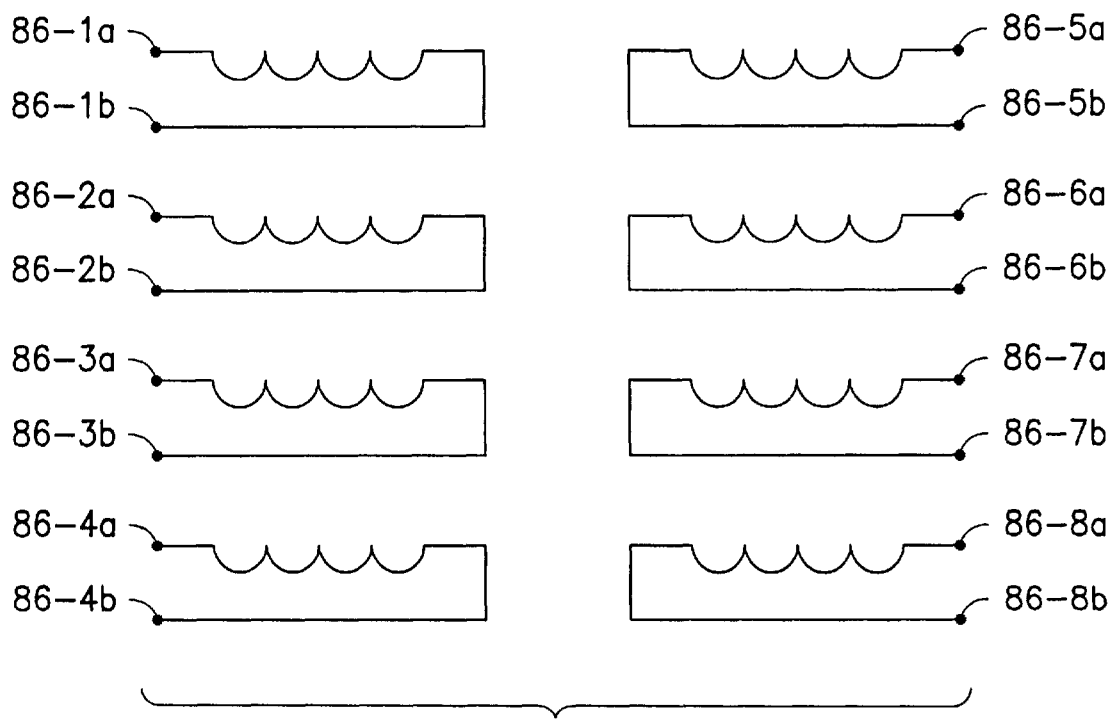
FIG. 4 is an electrical schematic for a manner of operating the tactile display system of the invention different from FIG. 3.

Another embodiment of the invention is displayed in FIG. 4 which presents another electrical schematic diagram. In this instance, each data line pin 86 (actually pins 86-1 through 86-8 under the control of circuitry 90) has its own supply (e.g. 86-1a, 86-2a, and so forth) and return (e.g. 86-1b, 86-2b, and so forth). Any or all of the data line pins may be accessed at any time. The disadvantage of this arrangement is that there is an increased pin count for each device or tactile display system 20.

Figure 5A:
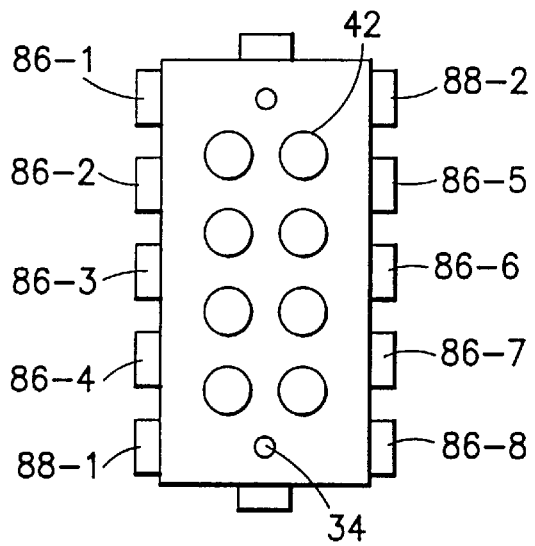
FIGS. 5a, 5b, and 5c are diagrammatic views generally illustrating the relationship between the electrical and mechanical systems of the invention.
Figure 5B:
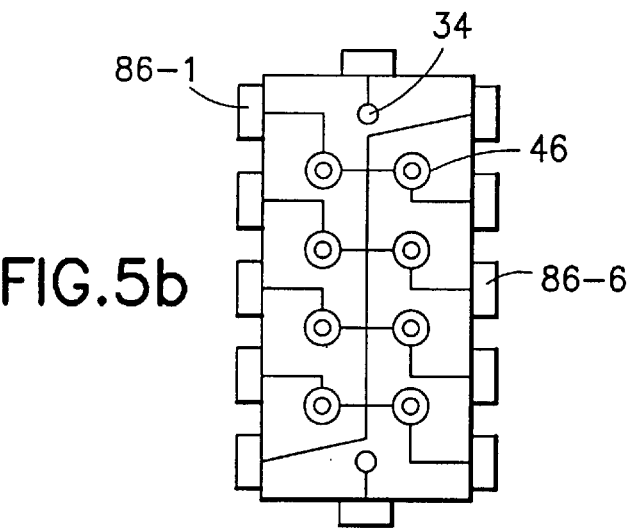
Figure 5C:
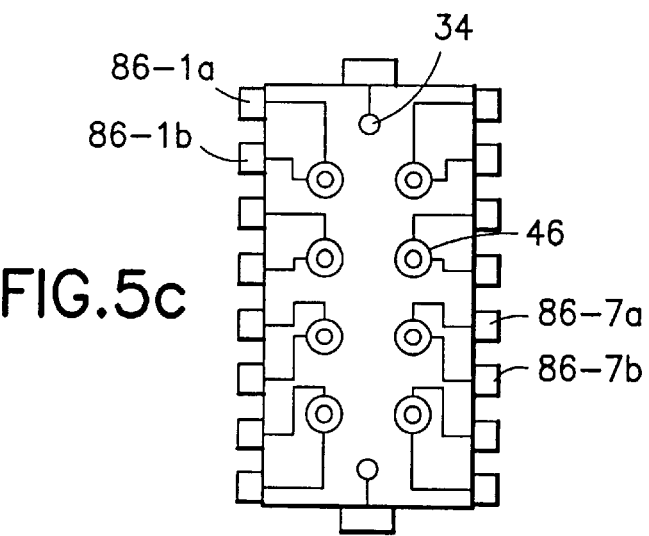

Turn now to FIGS. 5a, 5b, and 5c. As seen in FIGS. 5a and 5b, each tactile display system 20 has a total of 10 leads extending from opposite poles of each of the eight electromagnets 46 therein and FIG. 5c has 18 leads. Specifically, as previously explained, each electromagnet 46 has a positive lead and a negative lead, alternatively, 86-1-a, 86-1b, and so forth. More specifically, FIG. 5a depicts the physical pin layout for the sequentially accessed device indicated by the electrical circuit of FIG. 3. FIG. 5b depicts the internal connections for the sequentially accessed device of FIG. 3. FIG. 5c depicts the internal connections for a parallel accessed device as indicated by the electrical circuit of FIG.

Figure 6:
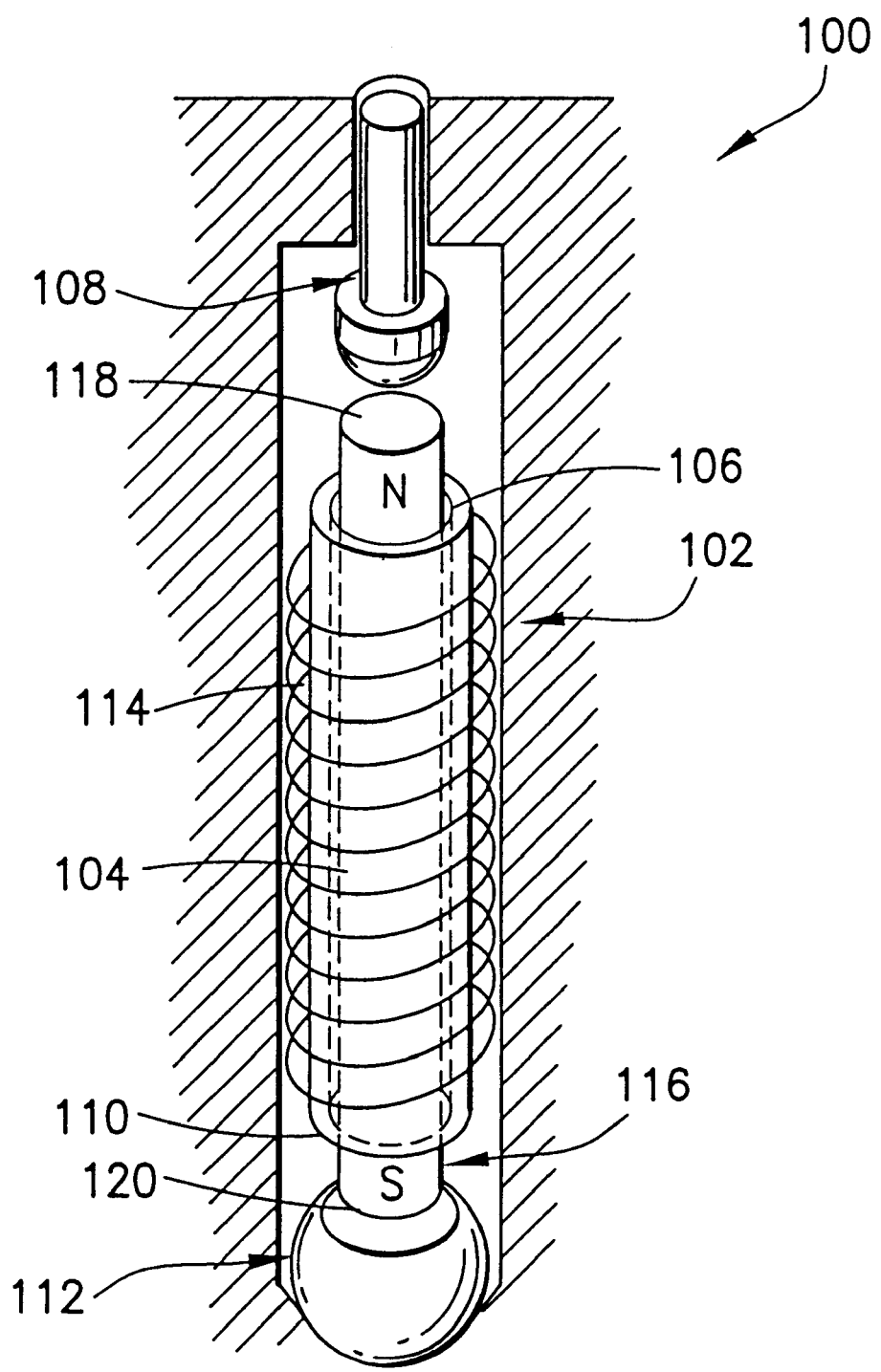
FIG. 6 is a perspective view, certain parts being cut away and shown in section, to illustrate another embodiment of the tactile display system of the invention.

4. Turn now to FIG. 6 for the description of another embodiment of the invention. In this instance, a modified tactile display system 100 is provided with an actuator mechanism 102 which includes an electromagnet with a ferrous cylinder 104 extending between a first end 106 proximate an associated tactile pin 108 and a second end 110 proximate an associated rotatable positioning member 112. The ferrous cylinder 104 supports an electrically energizing wire coil 114 contiguously wrapped around the ferrous cylinder between the first and second ends 106, 110.

The actuator mechanism 102 further includes a ferrous core member 116 axially slidable within the ferrous cylinder 104 and extends between a first end 118 engageable with the tactile pin 108 and a second end 120 engageable with the rotatable positioning member. Whereas in the embodiment of FIGS. 1, 2, and 2a, the rotatable positioning member is intermediate the tactile pin and the electromagnet, in this embodiment, the electromagnet is intermediate the tactile pin and the rotatable positioning member. The operation is similar to the earlier described embodiment except that, in this instance, the ferrous core member 116 is axially movable in accordance with the positioning of the rotatable positioning member 112 and is the member which transmits to the tactile pin 108 the result of the position assumed by the rotatable positioning member. A desirable feature of this embodiment resides in the fact that the rotatable positioning member 112 essentially performs no work but merely passively serves to allow the ferrous core member 116 to latch onto its selected surface (that is, spherical or truncated) only after the rotatable positioning member becomes re-positioned. Latching occurs when the second end 120 engages the spherical or truncated surface of the rotatable positioning member presented to it and engagement does not occur until the rotatable positioning member becomes re-positioned.

Figure 7:
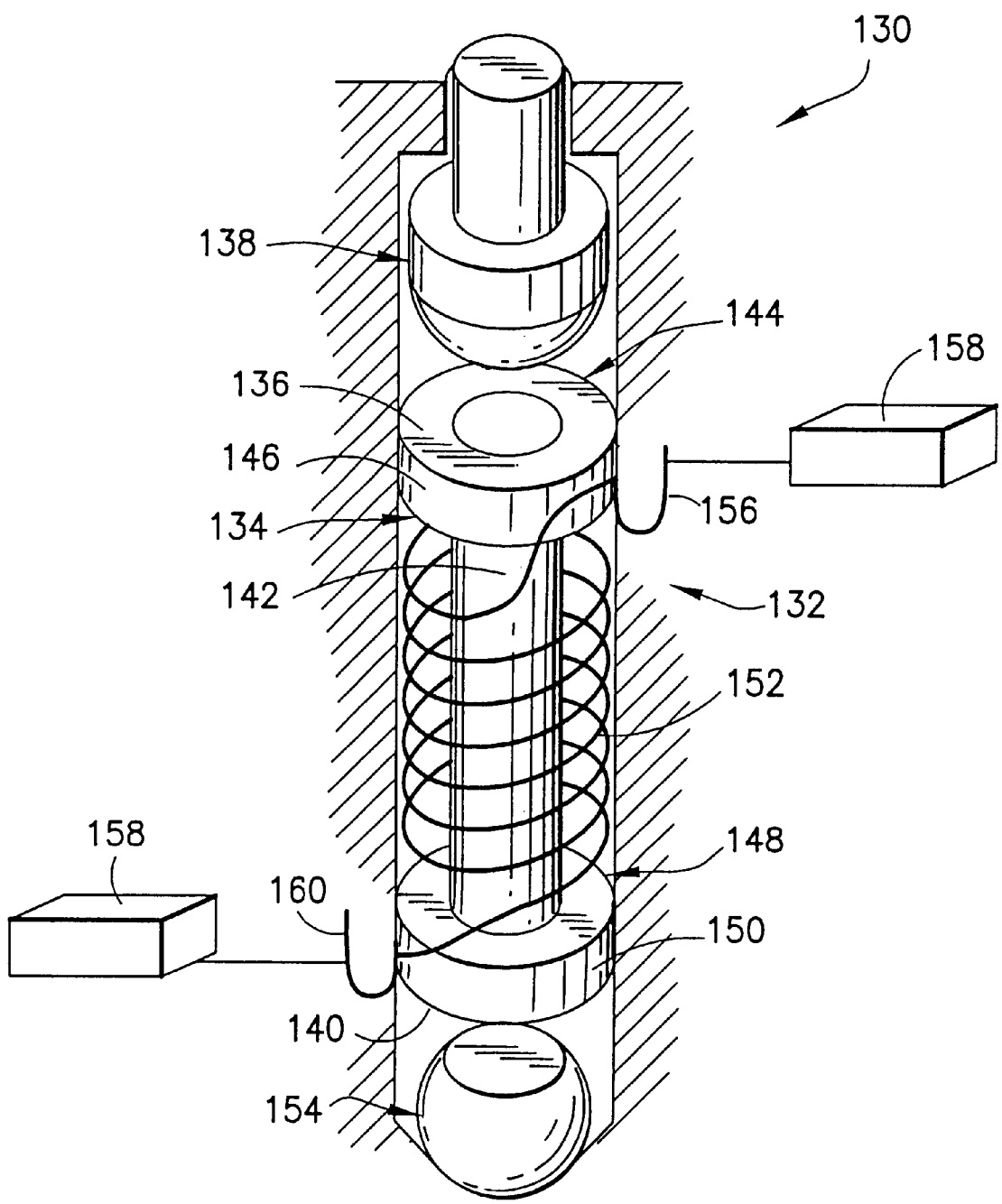
FIG. 7 is a perspective view, certain parts being cut away and shown in section, to illustrate still another embodiment of the tactile display system of the invention.

Turn now to FIG. 7 for the description of still another embodiment of the invention. In this instance, a modified tactile display system 130 is provided with a modified actuator mechanism 132 which includes a ferrous spool 134 extending between a first end 136 proximate a tactile pin 138 and a second end 140 proximate a rotatable positioning member 142. The ferrous spool 134 includes a central core member 142, a proximal disk 144 at the first end 136 lying in a plane transverse of the longitudinal axis of the actuator mechanism 132 and having an electrically conductive outer peripheral surface 146, and a distal disk 148 at the second end 140 also lying in a plane transverse of the longitudinal axis of the actuator mechanism and having an electrically conductive outer peripheral surface 150. An electrically energizing wire coil 152 is contiguously wrapped around the central core member 142 between the proximal disk 144 and the distal disk 148 and is connected to the electrically conductive outer peripheral surfaces 146, 150, respectively, of the proximal and distal disks.

With this construction, the ferrous spool 134 is longitudinally movable upon movement of a rotatable positioning member 154 between first and second positions as previously described. A first contact member 156 connected to an electrical circuit 158 for energizing the actuator mechanism 132 being engageable with the electrically conductive outer peripheral surfaces 146 of the proximal disk and a second contact member 160 connected to the electrical circuit 158 also for energizing the actuator mechanism 132 being engageable with the electrically conductive outer peripheral surface 160 of the distal disk. The first and second contact members 156, 160 remain in contact, respectively, with the electrically conductive outer peripheral surfaces 146, 150 of the proximal and distal disks 144, 148 throughout movement of the ferrous spool between the first and second positions. This embodiment provides another means for using an electromagnet to interact with the pin and the rotational member. This alternate configuration may be able to do more electromechanical work than the previously described embodiment. This is due to the fixed structure of the electromagnet where the windings are in direct contact to the core.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A tactile display system comprising:

a reference surface;

a tactile pin having a longitudinal axis movable axially in directions transverse of the reference surface between raised and lowered positions; and an actuator mechanism for selectively moving the tactile pin between the raised and lowered positions, the actuator mechanism including:

an elongated electromagnet distant from the reference surface having a longitudinal axis and first and second spaced poles of opposite, selectively reversible, polarity, the longitudinal axes of the tactile pin and the electromagnet being mutually aligned; and a generally spherical rotatable positioning member intermediate the reference surface and the electromagnet having an axis of rotation coaxial with the longitudinal axes of the tactile pin and of the electromagnet, the rotatable positioning member being a permanent magnet having a peripheral surface which is partially a spherical surface and partially a truncated surface, the positioning member being biased into engagement with the tactile pin and rotatable in response to operation of the electromagnet between a first position at which the spherical surface engages the tactile pin and moves it to the raised position and a second position at which the truncated surface engages the tactile pin and moves it to the lowered position.

2. A tactile display system as set forth in claim 1, a resilient member biasing the tactile pin into engagement with the rotatable positioning member.

3. A tactile display system as set forth in claim 1, a housing including an upper panel having the reference surface thereon and a lower panel in a sandwich construction, the upper panel having a transverse bore communicating with the reference surface, the lower panel having a cavity for freely receiving the rotatable positioning member, the cavity being in communication with the transverse bore;

the tactile pin being received in the transverse bore for movement axially in directions transverse of the reference surface; and at least one resilient member biasing the tactile pin into engagement with the rotatable positioning member.

4. A tactile display system as set forth in claim 3, wherein the transverse bore has a first annular shoulder facing away from the reference surface and wherein the tactile pin has a second annular shoulder facing and aligned with the first annular shoulder; and wherein the resilient member includes:
  a compression spring encircling the tactile pin and extending between the first annular shoulder and the second annular shoulder.

5. A tactile display system as set forth in claim 3,
wherein the transverse bore has a first annular shoulder facing the reference surface and wherein the tactile pin has a second annular shoulder facing and aligned with the first annular shoulder; and
wherein the resilient member includes:
  polymeric sealing material encircling the tactile pin and extending between the first annular shoulder and the second annular shoulder.

6. A tactile display system as set forth in claim 3,
a terminal board lying in a plane generally parallel to that of the reference surface and spaced from the lower panel and having a mounting bore therein for fittingly receiving the second pole of the electromagnet;
a data line pin fixed to and projecting from the terminal board in a direction extending away from the reference surface, the data line pin being in electrical continuity with the electromagnet; and
a ground pin fixed to and projecting from the terminal board in a direction extending away from the reference surface, the ground pin being in electrical continuity with the tactile pin;
whereby an electrical signal originating on the data line pin energizes the electromagnet to rotate the rotatable positioning member in a direction that corresponds to the polarity of the electrical signal, movement of the tactile pin being responsive to the positioning of the rotatable positioning member.

7. A tactile display system comprising:
a reference surface;
a plurality of tactile pins in parallel spaced apart relationship, each tactile pin having a longitudinal axis movable axially in directions transverse of the reference surface between raised and lowered positions; and
an actuator mechanism for selectively moving each tactile pin between the raised and lowered positions, the actuator mechanism including:
  an elongated electromagnet distant from the reference surface having a longitudinal axis and first and second spaced poles of opposite, selectively reversible, polarity, the longitudinal axes of the tactile pin and the electromagnet being mutually aligned;
  a generally spherical rotatable positioning member intermediate the reference surface and the electromagnet having an axis of rotation coaxial with the longitudinal axes of the tactile pin and of the electromagnet, the rotatable positioning member being a permanent magnet having a peripheral surface which is partially a spherical surface and partially a truncated surface, the positioning member being biased into engagement with the tactile pin and rotatable in response to operation of the electromagnet between a first position at which the spherical surface engages the tactile pin and moves it to the raised position and a second position at which the truncated surface engages the tactile pin and moves it to the lowered position.

8. A tactile display system as set forth in claim 7,
a resilient member biasing each of the tactile pins into engagement with its associated rotatable positioning member.

9. A tactile display system as set forth in claim 7,
a housing including an upper panel having the reference surface thereon and a lower panel in a sandwich construction, the upper panel having a plurality of transverse bores communicating with the reference surface, the lower panel having a plurality of cavities for freely receiving a rotatable positioning member, each cavity being in communication with an associated one of the transverse bores;
each tactile pin being received in an associated one of the transverse bores for movement axially in directions transverse of the reference surface; and
a resilient member biasing each of the tactile pins into engagement with its associated rotatable positioning member.

10. A tactile display system as set forth in claim 9,
wherein each cavity has a first region which includes a cylindrical bore coaxial with the transverse bore and a second region which includes a regular annular beveled surface extending from a major diameter at its intersection with the cylindrical bore to a minor diameter, the minor diameter being smaller than the diameter of the rotatable positioning member received in the cavity, the rotatable positioning member being slidably engaged with the annular beveled surface.

11. A tactile display system as set forth in claim 10,
wherein the annular beveled surface lies in a plane of revolution angled 45° from the longitudinal axes of the tactile pin and of the electromagnet.

12. A tactile display system as set forth in claim 9,
wherein each transverse bore has a first annular shoulder facing away from the reference surface and wherein its associated tactile pin has a second annular shoulder facing and aligned with the first annular shoulder; and
wherein the resilient member includes:
  a compression spring encircling each tactile pin and extending between the first annular shoulder and the second annular shoulder.

13. A tactile display system as set forth in claim 9,
wherein each transverse bore has a first annular shoulder facing away from the reference surface and wherein each tactile pin has a second annular shoulder facing and aligned with the first annular shoulder of its associated transverse bore; and
wherein the resilient member includes:
  polymeric sealing material encircling each tactile pin within the first associated transverse bore adjacent the reference surface and engaged with the tactile pin and with the bore for biasing the tactile pin toward the lowered position.

14. A tactile display system as set forth in claim 9,
a terminal board lying in a plane generally parallel to that of the reference surface and spaced from the lower panel and having a plurality of mounting bores therein for fittingly receiving the second poles of the electromagnets;
a plurality of data line pins fixed to and projecting from the terminal board in a direction extending away from the reference surface, each data line pin being in electrical continuity with an associated one of the electromagnets; and
at least one ground pin fixed to and projecting from the terminal board in a direction extending away from the reference surface, the ground pin being in electrical continuity with each of the tactile pins;

whereby an electrical signal originating on each data line pin energizes the electromagnet associated therewith to rotate the associated rotatable positioning member in a direction that corresponds to the polarity of the electrical signal, movement of the associated tactile pin being responsive to the positioning of the rotatable positioning member.

15. A tactile display system as set forth in claim 7, wherein the housing is composed of shielding material for electrically and magnetically isolating each actuator mechanism from its neighboring actuator mechanism.

16. A tactile display system comprising:
a housing having a reference surface and including an upper panel and a lower panel in a sandwich construction, the upper panel having a transverse bore communicating with the reference surface, the lower panel having a cavity for freely receiving a rotatable positioning member, the cavity being in communication with the transverse bore;
a tactile pin having a longitudinal axis received in the transverse bore movable axially in directions transverse of the reference surface between raised and lowered positions; and
an actuator mechanism for selectively moving the tactile pin between the raised and lowered positions, the actuator mechanism including:
an elongated electromagnet distant from the reference surface has a longitudinal axis and first and second spaced poles of opposite, selectively reversible, polarity, the longitudinal axes of the tactile pin and the electromagnet being mutually aligned; and
a generally spherical rotatable positioning member received in the cavity intermediate the reference surface and the electromagnet having an axis of rotation coaxial with the longitudinal axes of the tactile pin and of the electromagnet, the rotatable positioning member being a permanent magnet having a peripheral surface which is partially a spherical surface and partially a truncated surface, the positioning member being biased into engagement with the tactile pin and rotatable in response to operation of the electromagnet between a first position at which the spherical surface engages the tactile pin and moves it to the raised position and a second position at which the truncated surface engages the tactile pin and moves it to the lowered position.

17. A tactile display system as set forth in claim 16, wherein the cavity has a first region which includes a cylindrical bore coaxial with the transverse bore and a second region which includes a regular annular beveled surface extending from a major diameter at its intersection with the cylindrical bore to a minor diameter, the minor diameter being smaller than the diameter of the rotatable positioning member received in the cavity, the rotatable positioning member being slidably engaged with the annular beveled surface.

18. A tactile display system as set forth in claim 17, wherein the annular beveled surface lies in a plane of revolution angled 45° from the longitudinal axes of the tactile pin and of the electromagnet.

19. A tactile display system as set forth in claim 16, including:
a first conductive member on the reference surface; and
a second conductive member extending to an electrical circuit for detecting the presence of a user's finger resting on the first conductive member.

20. A tactile display system as set forth in claim 19, wherein the upper panel has at least one mounting bore and the lower panel has at least one mounting bore, the mounting bores and being mutually aligned; and
wherein the second conductive member includes a metallic stud received in the mounting bores for fastening the upper and lower panels together; and
wherein the first conductive member includes a head of the metallic stud engaged with the upper panel.

21. A tactile display system comprising:
a reference surface;
a tactile pin having a longitudinal axis movable axially in directions transverse of the reference surface between raised and lowered positions; and
an actuator mechanism engageable with the tactile pin for selectively moving the tactile pin between the raised and lowered positions, the actuator mechanism including:
an elongated electromagnet distant from the reference surface having a longitudinal axis and first and second spaced poles of opposite, selectively reversible, polarity, the longitudinal axes of the tactile pin and the electromagnet being mutually aligned; and
a generally spherical rotatable positioning member having an axis of rotation coaxial with the longitudinal axes of the tactile pin and of the electromagnet, the rotatable positioning member being a permanent magnet having a peripheral surface which is partially a spherical surface and partially a truncated surface, the positioning member being responsive to operation of the electromagnet and being movable between a first position at which the spherical surface faces the tactile pin and causes positioning of the tactile pin at the raised position and a second position at which the truncated surface faces the tactile pin and causes positioning of the tactile pin at the lowered position.

22. A tactile display system as set forth in claim 21, wherein the tactile pin is biased positioning the direction of the rotatable positioning member.

23. A tactile display system as set forth in claim 21, wherein the electromagnet includes a ferrous cylinder extending between a first end proximate the tactile pin and a second end proximate the rotatable positioning member, the ferrous cylinder supporting an electrically energizing wire coil contiguously wrapped therearound between the first and second ends; and
wherein the actuator mechanism includes a ferrous core member axially slidable within the ferrous cylinder and extending between a first end engageable with the tactile pin and a second end engageable with the rotatable positioning member.

24. A tactile display system as set forth in claim 21, wherein the electromagnet is intermediate the tactile pin and the rotatable positioning member.

25. A tactile display system as set forth in claim 21, wherein the rotatable positioning member is intermediate the tactile pin and the electromagnet.

26. A tactile display system as set forth in claim 21, wherein the electromagnet includes a ferrous spool extending between a first end proximate the tactile pin and a second end proximate the rotatable positioning member, the ferrous spool including:
a central core member;

a proximal disk at the first end lying in a plane transverse of the longitudinal axis of the electromagnet and having an electrically conductive outer peripheral surface;

a distal disk at the second end lying in a plane transverse of the longitudinal axis of the electromagnet and having an electrically conductive outer peripheral surface; and an electrically energizing wire coil contiguously wrapped around the central core member between the proximal disk and the distal disk and connected to the electrically conductive outer peripheral surfaces of the proximal disk and of the distal disk, respectively.

27. A tactile display system as set forth in claim 26, wherein the ferrous spool is longitudinally movable upon movement of the rotatable positioning member between the first and second positions; and including:

a first contact member connected to an electrical circuit for energizing the electromagnet being engageable with the electrically conductive outer peripheral surfaces of the proximal disk; and a second contact member connected to an electrical circuit for energizing the electromagnet being engageable with the electrically conductive outer peripheral surfaces of the distal disk;

the first and second contact members remaining in contact, respectively, with the electrically conductive outer peripheral surfaces of the proximal disk and of the distal disk throughout movement of the ferrous spool between the first and second positions.

28. A tactile display system as set forth in claim 21, including:

a resilient member biasing the tactile pin toward the lowered position.

29. A tactile display system as set forth in claim 21, a housing including an upper panel having the reference surface thereon and a lower panel in a sandwich construction, the upper panel having a transverse bore communicating with the reference surface, the lower panel having a cavity for freely receiving the rotatable positioning member, the cavity being in communication with the transverse bore;

the tactile pin being received in the transverse bore for movement axially in directions transverse of the reference surface; and a resilient member biasing the tactile pin toward the lowered position.

30. A tactile display system as set forth in claim 29, wherein the cavity has a first region which includes a cylindrical bore coaxial with the transverse bore and a second region which includes a regular annular beveled surface extending from a major diameter at its intersection with the cylindrical bore to a minor diameter, the minor diameter being smaller than the diameter of the rotatable positioning member received in the cavity, the rotatable positioning member being slidably engaged with the annular beveled surface.

31. A tactile display system as set forth in claim 30, wherein the annular beveled surface lies in a plane of revolution angled 45° from the longitudinal axes of the tactile pin and of the electromagnet.

32. A tactile display system as set forth in claim 29, wherein the transverse bore has a first annular shoulder facing away from the reference surface and wherein the tactile pin has a second annular shoulder facing and aligned with the first annular shoulder; and wherein the resilient member includes:

a compression spring encircling the tactile pin and extending between the first annular shoulder and the second annular shoulder.

33. A tactile display system as set forth in claim 29, wherein the transverse bore has a first annular shoulder facing away from the reference surface and wherein the tactile pin has a second annular shoulder facing and aligned with the first annular shoulder; and wherein the resilient member includes:

a resilient polymeric sealing material encircling the tactile pin and extending between the first annular shoulder and the second annular shoulder.

34. A tactile display system as set forth in claim 29, a terminal board lying in a plane generally parallel to that of the reference surface and spaced from the lower panel and having a mounting bore therein for fittingly receiving the second pole of the electromagnet;

a data line pin fixed to and projecting from the terminal board in a direction extending away from the reference surface, the data line pin being in electrical continuity with the electromagnet; and a ground pin fixed to and projecting from the terminal board in a direction extending away from the reference surface, the ground pin being in electrical continuity with the tactile pin;

whereby an electrical signal originating on the data line pin energizes the electromagnet to rotate the rotatable positioning member in a direction that corresponds to the polarity of the electrical signal, movement of the tactile pin being responsive to the positioning of the rotatable positioning member.

35. A tactile display system as set forth in claim 3, wherein the cavity has a first region which includes a cylindrical bore coaxial with the transverse bore and a second region which includes a regular annular beveled surface extending from a major diameter at its intersection with the cylindrical bore to a minor diameter, the minor diameter being smaller than the diameter of the rotatable positioning member received in the cavity, the rotatable positioning member being slidably engaged with the annular beveled surface.

36. A tactile display system as set forth in claim 35, wherein the annular beveled surface lies in a plane of revolution angled 45° from the longitudinal axes of the tactile pin and of the electromagnet.

* * * * *